(12) United States Patent
Desai et al.

(10) Patent No.: US 10,251,123 B2
(45) Date of Patent: Apr. 2, 2019

(54) RECEIVER START OF PACKET OPTIMIZATION FOR WIRELESS NETWORKS

(71) Applicant: Cisco Technology, Inc., San Jose, CA (US)

(72) Inventors: Vishal Desai, San Jose, CA (US); Tak Ming Pang, Palo Alto, CA (US); John Blosco, Norton, OH (US)

(73) Assignee: Cisco Technology, Inc., San Jose, CA (US)

( * ) Notice: Subject to any disclaimer, the term of this patent is extended or adjusted under 35 U.S.C. 154(b) by 43 days.

(21) Appl. No.: 15/644,785

(22) Filed: Jul. 9, 2017

(65) Prior Publication Data

US 2019/0014536 A1  Jan. 10, 2019

(51) Int. Cl.
| | | |
|---|---|---|
| *H04W 52/02* | (2009.01) | |
| *H04W 48/20* | (2009.01) | |
| *H04W 52/18* | (2009.01) | |
| *H04L 5/00* | (2006.01) | |
| *H04L 12/26* | (2006.01) | |
| *H04W 24/02* | (2009.01) | |
| *H04W 84/12* | (2009.01) | |

(52) U.S. Cl.
CPC ............. *H04W 48/20* (2013.01); *H04L 5/006* (2013.01); *H04L 43/16* (2013.01); *H04W 24/02* (2013.01); *H04W 52/18* (2013.01); *H04W 84/12* (2013.01)

(58) Field of Classification Search
CPC ..... H04W 48/20; H04W 24/02; H04W 52/18; H04W 84/12; H04W 28/08; H04W 72/0453; H04W 72/0473; H04W 88/08; H04L 5/006; H04L 43/16
See application file for complete search history.

(56) References Cited

U.S. PATENT DOCUMENTS

| | | | | |
|---|---|---|---|---|
| 2007/0105586 A1* | 5/2007 | Kim | ...................... | H04W 24/02 455/525 |
| 2007/0253352 A1* | 11/2007 | Arisha | ................ | H04W 52/245 370/328 |

(Continued)

FOREIGN PATENT DOCUMENTS

EP      1806010      7/2007

OTHER PUBLICATIONS

WiFi Nigel Blogspot; What Are Sticky Clients? (Mar. 2, 2015).

*Primary Examiner* — Wutchung Chu

(57) ABSTRACT

In one embodiment, a method implemented on a computing device includes: selecting a wireless access point (AP) to process from among a deployment of wireless access points (APs), defining a neighborhood based on the AP and neighboring APs, where the neighboring APs are within a one-hop radius of the AP, calculating a client distribution optimal received signal strength indicator (RSSI), where the client distribution optimal RSSI (CD optimal) is a minimum receiver start of packet detection threshold (RX-SOP) setting for maintaining existing client device coverage by the AP, calculating a neighbor relations optimal RSSI threshold (NR optimal), where the NR optimal is a function of at least a transmit power control threshold (TPC) for maintaining visibility between the AP and the neighboring APs, calculating an RX-SOP setting for the AP as a function of CD optimal and NR optimal, and applying the RX-SOP setting to the AP.

20 Claims, 3 Drawing Sheets

(56) References Cited

U.S. PATENT DOCUMENTS

| | | | |
|---|---|---|---|
| 2010/0203889 A1* | 8/2010 | Mittal | H04W 36/0094 |
| | | | 455/436 |
| 2013/0028158 A1* | 1/2013 | Lee | H04W 52/0206 |
| | | | 370/311 |
| 2013/0176870 A1* | 7/2013 | Huang | H01Q 1/246 |
| | | | 370/252 |
| 2014/0241240 A1 | 8/2014 | Kloper et al. | |
| 2015/0098392 A1* | 4/2015 | Homchaudhuri | H04W 48/20 |
| | | | 370/329 |
| 2016/0080954 A1 | 3/2016 | Hedayat | |
| 2016/0183181 A1* | 6/2016 | Lee | H04B 17/26 |
| | | | 370/338 |
| 2016/0353329 A1 | 12/2016 | Kakani | |
| 2017/0311249 A1* | 10/2017 | Lopes | H04W 76/30 |
| 2018/0242169 A1* | 8/2018 | Kowal | H04W 24/02 |

* cited by examiner

RECEIVER START OF PACKET OPTIMIZATION FOR WIRELESS NETWORKS

FIELD OF THE INVENTION

The present invention generally relates to the optimizing of Receiver Start of Packet Detection Threshold (RX-SOP) in wireless networks.

BACKGROUND OF THE INVENTION

Receiver Start of Packet Detection Threshold (RX-SOP) is a setting for a Wi-Fi access point (AP) that represents a minimum signal level, typically measured in dBm (decibel per milliwatts), for which the AP will demodulate and decode a packet. The AP will ignore weaker signals that do not meet the value set for RX-SOP. Accordingly, higher RX-SOP settings will effectively reduce the coverage area of the receiver cell served by the AP, thereby reducing the number of client devices connecting with weaker connections to the AP. A higher RX-SOP setting also typically results in higher data rates for client devices that do connect to the AP, as there is less competition for the AP's bandwidth and there are also presumably fewer dropped packets due to the stronger signal. Higher RX-SOP settings work well in high density environments such as stadiums and large auditoriums where there are a large number of client devices connected per AP. In a high density environment, smaller cell sizes generally provide higher quality service.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

A method implemented on a computing device includes: selecting a wireless access point (AP) to process from among a deployment of wireless access points (APs), defining a neighborhood based on the AP and neighboring APs, where the neighboring APs are within a one-hop radius of the AP, calculating a client distribution optimal received signal strength indicator (RSSI), where the client distribution optimal RSSI (CD optimal) is a minimum receiver start of packet detection threshold (RX-SOP) setting for maintaining existing client device coverage by the AP, calculating a neighbor relations optimal RSSI threshold (NR optimal), where the NR optimal is a function of at least a transmit power control threshold (TPC) for maintaining visibility between the AP and the neighboring APs, calculating an RX-SOP setting for the AP as a function of CD optimal and NR optimal, and applying the RX-SOP setting to the AP.

DETAILED DESCRIPTION OF EXAMPLE EMBODIMENTS

An AP typically has access to radio frequency (RF) measurements and metrics for the AP's performance. These measurements and metrics may be used to tune the AP's RX-SOP setting. However, it will be appreciated by one of ordinary skill in the art that such measurements and metrics may be focused on the individual AP, without addressing the current RF environment of that AP's "neighborhood" (referred to hereinafter also as "RF neighborhood"), i.e., the surrounding APs within first-hop signal range of the individual AP. Accordingly, it will also be appreciated that an individual AP autonomously setting RX-SOP based on individually focused RF measurement and metrics may not set RX-SOP in view of the optimal needs of the RF neighborhood as whole.

Possible ramifications of an individually based RX-SOP setting may, for example, include:

AP over coverage, where a given AP's resources are inefficiently expended extending coverage to an area more efficiently served by a second AP.

Sticky clients, where roaming client devices served by a given AP are not handed off to other APs that are better positioned to provide service as they move through an RF neighborhood.

Increased co-channel interference between APs and neighbor client devices, where neighboring APs and clients running on the same channel frequency add noise to each other's communications.

Coverage holes, where roaming client devices at the edge of an AP's coverage area fail to locate and/or connect with another AP Impact on existing radio resource management (RRM) settings for AP neighbor relationships and adjacency calculations, which are typically used to compute channel and transmit power assignments.

Figure 1:
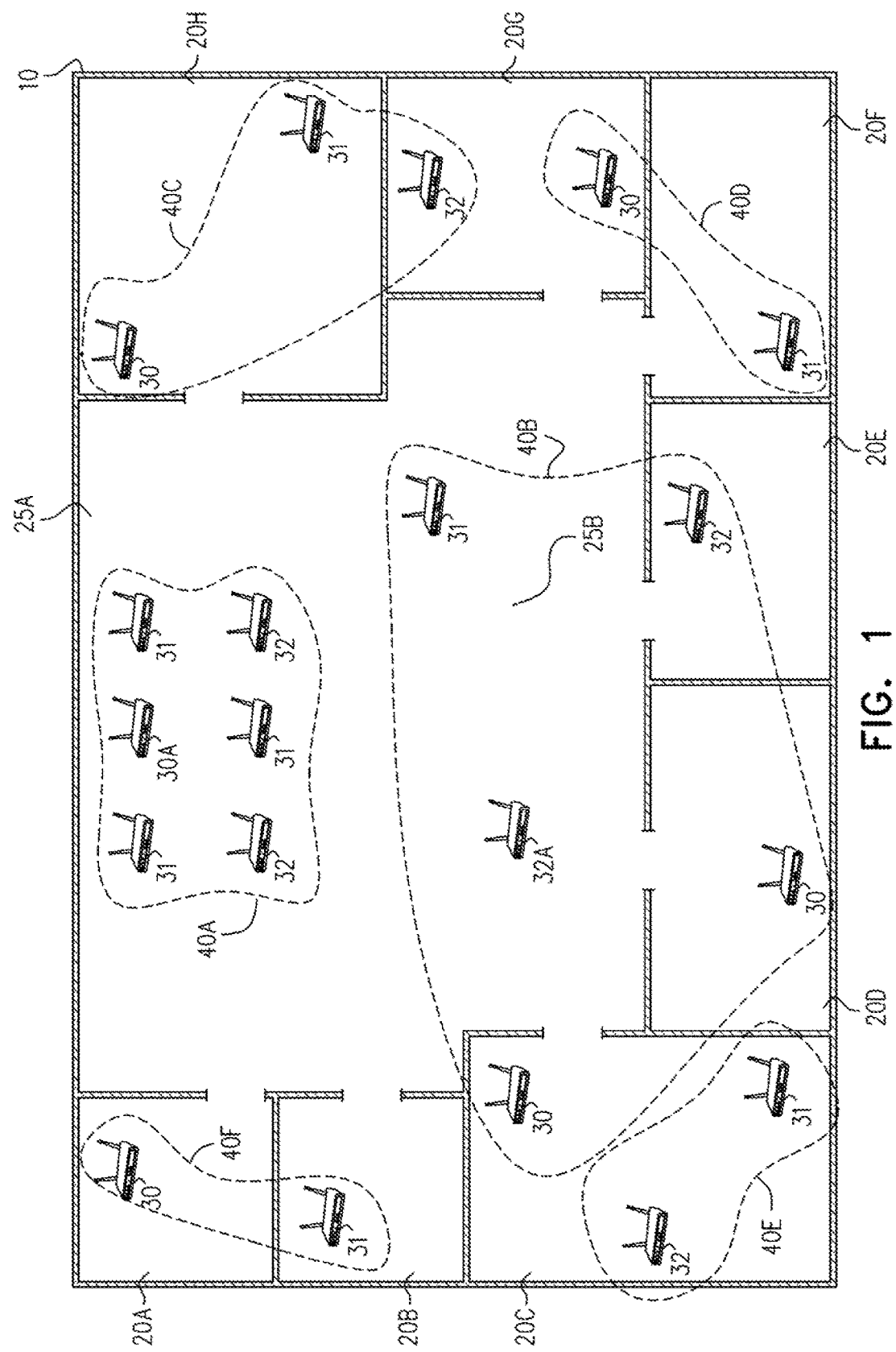
FIG. 1 is a schematic illustration of an exemplary WiFi access point deployment in accordance with embodiments described herein.

In accordance with embodiments described herein, a centralized controlling function may be employed to address AP-specific Rx-SOP configuration from a system and overall network point of view. Readily available existing metrics may be leveraged to dynamically compute and apply Rx-SOP for AP radios within a Wi-Fi network. Reference is now made to FIG. 1 which a schematic illustration of exemplary Wi-Fi access point deployment 10 in accordance with embodiments described herein. Deployment 10 as depicted in FIG. 10 represents a deployment of APs in a shopping mall. It will, however, be appreciated that the depiction of deployment 10 as a shopping mall is exemplary; the embodiments described herein may support other enterprise Wi-Fi deployments as well, for example, in sporting venues, hotels, office building, amusement parks, etc.

Deployment 10 comprises a multiplicity of APs 30, 31, and 32 (collectively referred to herein as APs 3x) deployed in stores 20A-20H (collectively referred to herein as stores 20), and open spaces 25A and 25B. APs 3x are organized in neighborhoods 40A-40F (collectively referred to herein as neighborhoods 40), such that each AP 3x is in one of neighborhoods 40. In accordance with the exemplary embodiment of FIG. 1, APs 3x may be configured to operate using channels allocated in the 2.4 GHz band. It will be appreciated that the 2.4 GHz supports the allocation of three distinct channels for Wi-Fi operations. Accordingly, in the exemplary embodiment of FIG. 1, all APs 30 (including AP 30A) may be assumed to be configured to use the same channel; all APs 31 may be assumed to use a second channel; and all APs 32 (including AP 32A) may be assumed to use a third channel. It will also be appreciated that the use of the 2.4 GHz band may be exemplary; the embodiments described herein may also support Wi-Fi deployed in the 5 GHz band or other wireless spectrums.

In accordance with embodiments described herein, the centralized controlling function may optimize RX-SOP settings on a per neighborhood 40 basis, prioritized according to the number of client devices served in a given period of time and the size of the neighborhoods 40, where the size of a neighborhood 40 is determined according to the number of APs within a first-hop radius of the AP 3x in the neighborhood 40 with the most client devices served.

For example, in accordance with an exemplary embodiment open space 25A may be a food court with heavy Wi-Fi usage by its customers, and as a result, during a given period of time AP 30A may serve the most client devices of the APs in deployment 10. Neighborhood 40A may therefore be determined according to AP 30A and any other APs that AP 30A may "see" (i.e., communicate directly with), for example, the two APs 32 and three APs 31 included in neighborhood 40A in FIG. 1.

The next neighborhood 40 may be determined according to the remaining AP 3x (i.e. not in neighborhood 40A) with the most client devices served. In accordance with the same exemplary embodiment, AP 32A may be the remaining AP 3x with the most client devices served. Neighborhood 40B may therefore be determined according to AP 32A and any other APs that AP 32A may see, for example, the two APs 30, one AP 31, and the other AP 32 included in neighborhood 40B in FIG. 1. It will be appreciated that in addition to AP 30A, one or more of the APs 3x in neighborhood 40A may have more client devices served than AP 32A. However, since each AP 3x may belong to only one of neighborhoods 40, APs 3x already included in a neighborhood 40 are not eligible for inclusion in a different neighborhood 40. It will be appreciated that the other neighborhoods 40 may be determined in a similar manner. It will also be appreciated that areas of deployment not included in a given neighborhood 40 may still receive Wi-Fi coverage from APs 3x physically located in neighborhoods 40; the coverage area of a given AP 3x may extend beyond the physical demarcation of neighborhoods 40 as depicted in FIG. 1.

Figure 2:
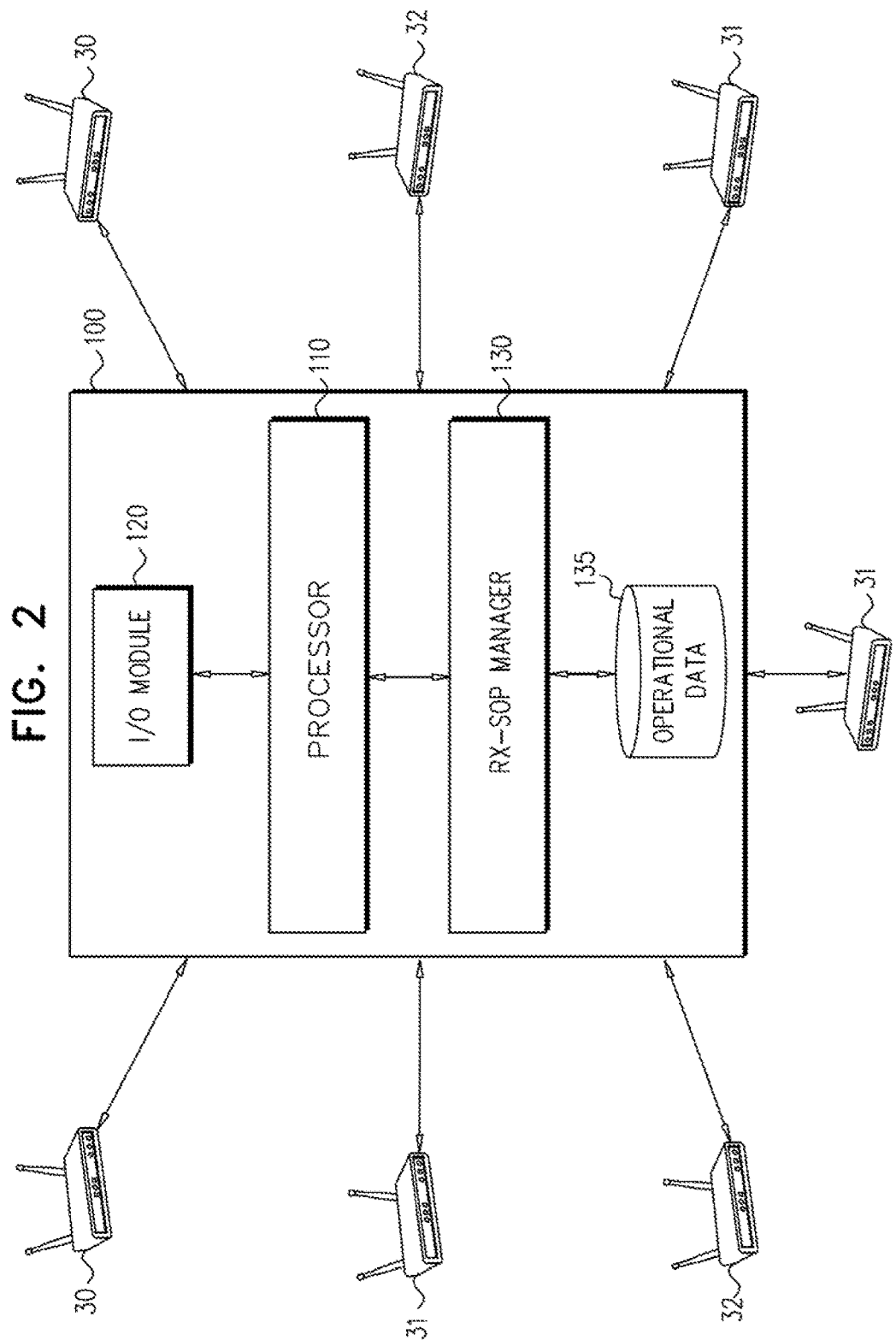
FIG. 2 is a schematic illustration of an RX-SOP Optimizer Server configured and operative in accordance with embodiments described herein to at least manage RX-SOP settings for the access points of FIG. 1.

Reference is now made to FIG. 2 which is a schematic illustration of an RX-SOP optimizer server 100, configured and operative in accordance with embodiments described herein to at least manage RX-SOP settings for APs 3x as described with respect to FIG. 1. Server 100 may be any suitable computing device(s) that may support the centralized controlling function for optimizing RX-SOP settings as described herein. For example, server 100 may implemented on a multi-purpose personal computer, computer tablet, or smartphone. Server 100 may also be implemented on a communications router or switch, or on a dedicated Internet of Things (IoT) device. Server 100 may also be implemented as an integrated component on one or more APs 3x.

Server 100 comprises processor 110, input/output (I/O) module 120 and RX-SOP manager 130. It will be appreciated that server 100 may comprise more than one processor 110. For example, one such processor 110 may be a special purpose processor operative to at least execute RX-SOP manager 130 to calculate and apply an RX-SOP setting for one or more APs 3x. Processor 110 may be operative to execute instructions stored in a memory (not shown).

I/O module 120 may be any suitable software or hardware component such as a universal serial bus (USB) port, disk reader, modem or transceiver that may be operative to use protocols such as are known in the art to communicate with APs 30, 31, and 32 over a communications network such as, for example, the Internet, or via a WiFi connection. It will be appreciated that the embodiments described herein may also support configurations where some or all of the communications between I/O module 120 and APs 3x is brokered by a local server and forwarded to I/O module 120 over the Internet, a local area network and/or a suitable wireless technology. At least some of the functionality attributed herein to server 100 may be also performed on such a local server. It will similarly be appreciated that since I/O module 120 is operative to communicate with APs 3x, the physical location of server 100 may not necessarily be within close proximity to deployment 10.

Figure 3:
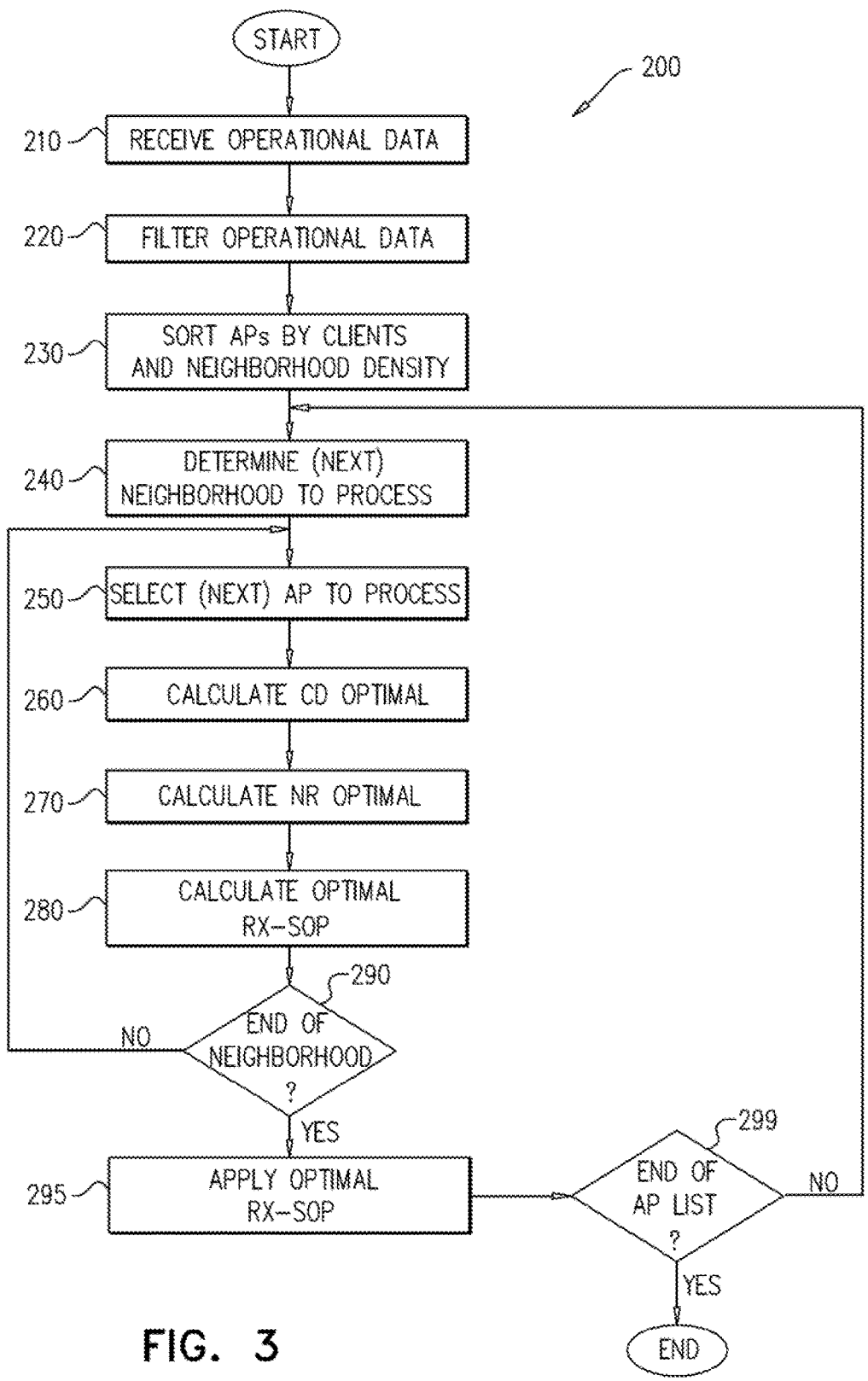
FIG. 3 is a flowchart of an RX-SOP optimization process performed by the server of FIG. 2 for the access points of FIG. 1.

RX-SOP manager 130 may be an application implemented in hardware or software that may be executed by processor 110 in order to at least calculate and apply an RX-SOP setting for APs 3x based on operational data 135. Reference is now made to FIG. 3 which is a flowchart of an RX-SOP optimization process 200 performed by RX_SOP manager 130 to optimize APs 3x (FIG. 1).

RX-SOP manager 130 receives (step 210) operational data 135 via I/O module 120 from APs 3x. It will be appreciated that operational data 135 may be received by I/O module 120 directly from APs 3x, either via WiFi and/or a wired connection. Alternatively, or in addition, operational data 135 may be collected by a local or remote server, for example, an RRM server available, and forwarded via I/O module 120 as needed.

In accordance with embodiments described herein, operational data 135 may include at least RSSI (Received Signal Strength Indicator) data measured from traffic and probing patterns of client devices. It will be appreciated that RSSI may serve as a proxy measure of the power level that a RF client device is receiving from an AP 3x. As will be described in greater detail hereinbelow, the RSSI data may be used to develop client distribution metrics for optimizing and preserving existing client coverage.

Operational data 135 may also include data regarding the number of neighboring APs 3x that may be visible (i.e., with which control data may be exchanged) to a given AP 3x. Such visibility data may be used to determine neighbor relations density for minimizing co-channel interference between APs 3x, and maintaining cell size. Neighbor relations density may be defined as the number of neighboring APs 3x a given AP 3x may see above certain RSSI threshold. Such data may be sourced, for example, using RRM software embedded in a Cisco Wireless LAN Controller available from Cisco Systems, Inc. Such software includes an RRM power control algorithm that leverages neighbor relations to approximate inter-AP distance and may be used to set transmission power based on a determination of optimal "Transmit Power Control Threshold" (TPC threshold). The TPC threshold determines how sparse or dense cell overlap is needed for transmit power control optimizations.

RX-SOP manager 130 may filter (step 220) operational data 135. The filtered data may generally be associated with APs which process 200 may not be capable of providing optimization. For example, data for third party APs (i.e., APs whose settings may not be configurable by RX-SOP manager 130) may be excluded from further analysis. Similarly, data for APs in monitor mode may also be excluded, as optimization may be irrelevant for a monitor mode AP.

RX-SOP manger 130 may also filter data associated with blacklisted client devices. For blacklisted client devices, probing data may be excluded for the receiving AP 3x and the blacklisted client device may not be considered as a client device for an AP 3x.

RX-SOP manager 130 may sort (step 230) the remaining APs 3x (i.e., APs 3x remaining after step 220) according to the number of client devices served, or total downstream and/or upstream traffic load and/or a combination thereof. RX-SOP may determine (step 240) an RF neighborhood to process according to the AP 3x with the greatest number of clients served as per step 230. For example, with reference to the exemplary embodiment of FIG. 1, AP 30A may be the AP 3x with the greatest number of client devices served. Alternatively, step 240 may be implemented using a function of total client load, e.g., total downstream and/or upstream traffic, to determine the RF neighborhood to process. In some implementations, step 240 may determine the RF neighborhood to process according to a weighted combination of client devices and traffic load. Accordingly, RX-SOP manager 130 may select neighborhood 40A in a first iteration of step 240. It will be appreciated that the depiction of step 230 as a distinct step from step 240 may be exemplary. The embodiments described herein may also support the implicit inclusion of the functionality of step 230 within step 240.

Continuing in the context of the exemplary embodiment of FIG. 1, RX-SOP manager 130 may select (step 250) AP 30A to process. This selection is based on AP 30A having the most client devices served in neighborhood 40A.

RX-SOP manager 130 may then calculate (step 260) client distribution optimal RSSI (CD optimal) for the selected AP, i.e., AP 30A. CD optimal may be characterized as a minimum RX-SOP setting for preserving existing client device coverage. RX-SOP manager 130 may calculate CD optimal as a function of a client acceptance threshold and a lowest observed client device RSSI as per the relevant data (i.e. data associated with the selected AP 3x) in operational data 135. The client acceptance threshold is calculated as the minimum of an optimized roaming threshold (OR RSSI Cutoff) and a lowest RSSI check threshold (association cutoff). The association cutoff represents a minimum observed RSSI at which a client device successfully associated with the selected AP 3x (e.g., AP30A as per the embodiment of FIG. 1). The OR RSSI cutoff represents a minimum observed RSSI for continuing an existing client device association with the selected AP 3x. Accordingly, the client acceptance threshold may be calculated to at least partially constrain RX-SOP to enable existing associated client devices and/or probing client devices to continue to associate with the selected AP 3x.

In accordance with embodiments described herein, observed RSSIs from probes and associations from client devices that are detected by other nearby APs 3x in the same RF neighborhood may be used to further modify the client acceptance threshold. If the lowest observed RSSI from among these other client devices in the same RF neighborhood is significantly higher (i.e. at least 6 dBm higher) than the client acceptance threshold, then RX-SOP manager 130 may lower the client acceptance threshold. For example, If the client admission threshold is −70 dBm, but the lowest observed RSSI of the client devices are associated with an RSSI of −50 or −55 dBm, then RX-SOP manager 130 may use the relatively stronger RSSI of the observed weakest client device (i.e., −50 or −55 dBm) to determine the client admission threshold instead of the minimum of OR RSSI cutoff and the association cutoff. In accordance with embodiments described herein, observed peak RSSI and/or average RSSI may also be used in a similar manner to provide bias towards a more aggressive Rx-SOP threshold.

CD optimal may then be calculated as: CD optimal=iota (client acceptance threshold)+theta (lowest observed RSSI), where iota and theta are functions, and 0<theta<<iota<1. In accordance with embodiments described herein, the value of iota may be in the range of 0.75 to 0.99. The value of theta may be in the range of 0.01 to 0.15.

RX-SOP manager 130 may calculate (step 270) a neighbor relations optimal RSSI threshold (NR optimal) as a function of the TPC threshold for the selected AP 3x and the RSSI of the closest neighbor AP 3x on same channel. For example, in the exemplary embodiment of FIG. 1, the closest neighbor AP 3x on same channel as AP 32A is the AP 32 in store 20E. It will be appreciated that the determination of the closest neighbor AP 3x on the same channel is not limited to APs 3x in the same neighborhood 40. For example, one of the APs 32 in neighborhood 40A may actually be closer to AP 32A, even if it is in a different neighborhood 40 based on its proximity to AP 30A. The inclusion of the RSSI of the closest neighbor in the calculation of NR optimal may represent a small bias towards the closest neighbor on the same channel as the selected AP 3x. This may provide further optimization towards the co-channel inducing AP 3x, thereby ultimately imposing symmetrical transmit and receive radius on a given AP 3x.

RX-SOP manager 130 may calculate NR Optimal as a weighted sum of TPC threshold and the RSSI of the closest neighbor on same channel. It will be appreciated that NR optimal may be biased towards TPC threshold as follows: NR Optimal=alpha (tpc_threshold)+beta (closest_neighbor_rssi), where alpha and beta are functions, and 0<beta<<alpha<1, and alpha+beta=1. In accordance with embodiments described herein, the value of alpha may be in the range of 0.50 to 1.00. The value of beta may be in the range of 0.00 to 0.50.

In accordance with embodiments described herein, RX-SOP manager 130 may calculate (step 280) an optimal RX-SOP threshold for the selected AP 3x as the minimum of CD optimal and NR optimal. Alternatively, based on network topology and client requirements, RX-SOP manager 130 may add bias factors for each of these calculated thresholds when necessary. For example, the optimal RX-SOP threshold may be calculated as: Optimal Rx-SOP=MIN [(psi×CD Optimal), (omega×NR Optimal)], where 1<=psi, and omega<=1.5. In accordance with embodiments described herein, the value of psi may be in the range of 1.00 to 1.50. The value of omega may be in the range of 1.00 to 1.50.

It will be appreciated that the exemplary values presented herein for functions alpha, beta, iota, theta, psi, and omega may have been determined according to empirical observation using a population of APs in a test environment.

If all of the APs 3x in the currently processed neighborhood 40 have not yet been processed (step 290), control may return to step 250 where a next AP 3x from the currently processed neighborhood may be selected for processing. In step 250 the AP 3x in the currently processed neighborhood with the next highest number of client devices served in the given period of time may be selected for processing. It will be appreciated that in such manner, an optimal RX-SOP for each of the APs 3x in a neighborhood 40 may be calculated in succeeding iterations of the processing flow from step 250 through step 280.

If all of the APs 3x in the currently processed neighborhood 40 have been processed (step 290), RX-SOP manager 130 may apply (step 295) the individually calculated optimal RX-SOP settings to each associated AP 3x in neighborhood 40. It will be appreciated that Rx-SOP optimization may be applied to the entire group of APs 3x in neighborhoods 40 in a single iteration, thereby preventing cascading and pinging between adjacent Aps 3x which may result in potential coverage holes.

RX-SOP manager 130 may check whether all of the APs 3x in deployment 10 have been processed (step 299). If there are still remaining APs 3x to process, control may return to step 240 where RX-SOP manager 130 may determine the next neighborhood 40 to process, based on client devices served and (if necessary) number of neighbors. Alternatively, in accordance with some embodiments, step 299 may comprise checking whether a threshold percentage of the APs 3x in deployment 10 have been processed. It will be appreciated that most, if not all, of the utility from process 200 may be realized by processing the "busiest" RF neighborhoods serving the greatest number of client devices. There may be less need for optimization of "quieter" neighborhoods serving fewer client devices. Accordingly, process 200 may alternatively be configured to process only a percentage of the APs 3x, e.g., 10%, 20%, 50%, 75%, etc. under the assumption that most of the utility realized is from processing the busier RF neighborhoods.

It will be appreciated that process 200 may be configured to run on a periodic basis with intervening "sleep" periods during which additional operational data 135 may be collected. For example, process 200 may be configured to run at daily, weekly, monthly, etc. intervals using operational data 135 from a time period generally corresponding to at associated processing interval.

It will be appreciated that in a high AP density deployment, the embodiments described herein may serve to reduce receiver cell sizes to avoid co-channel interference from neighboring APs. This may effectively load balance client devices to their nearest AP, thereby improving data rate and performance.

It will also be appreciated that the embodiments described herein may dynamically adjust receiver cell size to match transmission power control transmitter cell size to form symmetric receiver and transmission coverage, thereby eliminating weak and sticky client devices on the edge of the receiver cells and encouraging client devices to roam to an AP with a more suitable RF signal.

It will also be appreciated that in a high client density deployment, the embodiments described herein may support autonomous adjustment of the receiver cell size by an AP to tune into strong clients and avoid co-channel interference from neighbor client transmissions.

It will also be appreciated that the embodiments described herein may support periodic autonomous operation, thereby providing enhanced network performance without necessitating manual operation.

It will also be appreciated that the embodiments described herein leverage existing metrics, thereby facilitating implementation in software without specialized hardware and/or firmware upgrades.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof:

What is claimed is:

1. A method implemented on a computing device, the method comprising:
   selecting a wireless access point (AP) to process from among a deployment of wireless access points (APs);
   defining a neighborhood based on said AP and neighboring APs, wherein said neighboring APs are within a one-hop radius of said AP;
   calculating a client distribution optimal received signal strength indicator (RSSI), wherein said client distribution optimal RSSI (CD optimal) is a minimum receiver start of packet detection threshold (RX-SOP) setting for maintaining existing client device coverage by said AP;
   calculating a neighbor relations optimal RSSI threshold (NR optimal), wherein said NR optimal is a function of at least a transmit power control threshold (TPC) for maintaining visibility between said AP and said neighboring APs;
   calculating an RX-SOP setting for said AP as a function of said CD optimal and said NR optimal; and
   applying said RX-SOP setting to said AP.

2. The method according to claim 1 wherein said selecting comprises:
   selecting said AP from among a population of network access points in said deployment according to at least a greatest number of client devices served, wherein said greatest number of client devices served is determined based on operational data for said AP for a given period of time.

3. The method according to claim 2 wherein said selecting also comprises:
   selecting said AP from among at least two of said population of network access points according to a greater number of neighboring APs, wherein said at least two of said population of network access points have a same number of client devices served.

4. The method according to claim 1 wherein said calculating said CD optimal comprises:
   calculating a lowest RSSI check threshold (association cutoff) as a minimum observed RSSI at which a client device successfully associated with said AP;
   calculating an optimized roaming threshold (OR RSSI Cutoff) as a minimum observed RSSI for continuing an existing client device association with said AP;
   calculating a client acceptance threshold as a minimum of said OR RSSI Cutoff and said association cutoff; and; and
   calculating said CD optimal as a function of said client acceptance threshold and a lowest observed client device RSSI.

5. The method according to claim 4 wherein said function is:

CD optimal=iota (client acceptance threshold)+theta (lowest observed client device RSSI), wherein iota and theta are functions, and $0<\text{theta}\ll\text{iota}<1$.

6. The method according to claim 5 wherein said iota is a value ranging from 0.7 to 0.99, and said theta is a value ranging from 0.01 to 0.15.

7. The method according to claim 1 wherein said calculating said NR optimal comprises: calculating NR optimal as:

NR optimal=alpha (TPC)+beta (closest neighbor RSSI), wherein alpha and beta are functions, and 0<beta<<alpha<1, and alpha+beta=1, and wherein said closest neighbor ISSI is an RSSI of a closest neighbor on the same channel.

8. The method according to claim 7 wherein said alpha is a value ranging from 0.50 to 1.00, and said beta is a value ranging from 0.00 to 0.50.

9. The method according to claim 1 wherein said calculating an RX-SOP setting comprises:
calculating said RX-SOP as a minimum of CD optimal and NR optimal.

10. The method according to claim 1 wherein said calculating an RX-SOP setting comprises calculating said RX-SOP as:

RX-SOP=MIN[(psi×CD Optimal),(omega×NR Optimal)], where 1<=psi, and omega<=1.5.

11. The method according to claim 10 wherein said psi is a value ranging from 1.00 to 1.50, and said omega is a value ranging from 1.00 to 1.50.

12. The method according to claim 1 and further comprising:
iteratively performing said calculating CD optimal, NR optimal, and said RX-SOP setting for each of said neighboring APs.

13. The method according to claim 12 and further comprising:
applying said RX-SOP setting for each of said neighboring APs concurrently with said applying said RX-SOP setting to said AP.

14. The method according to claim 1 and further comprising:
selecting a next AP to process, wherein said next AP is not in said neighborhood;
defining a next neighborhood according to said next AP and next neighborhood APs, wherein said next neighborhood APs are wireless access points within a one-hop radius of said next AP that are not in said neighborhood and not in a previous iteration of said next neighborhood;
iteratively performing said calculating CD optimal, NR optimal, and said RX-SOP setting for said next AP and each of said neighborhood APs; and
applying said RX-SOP setting to said next AP and each of said neighborhood APs.

15. The method according to claim 14 and further comprising:
iteratively performing said selecting a next AP and defining a next neighborhood until at least a defined percentage of said APs have been associated with said neighborhood or an iteration of said next neighborhood.

16. The method according to claim 1 wherein said deployment of wireless APs is a deployment of Wi-Fi APs.

17. A system comprising:
a processor,
an input/output (I/O) module operative to receive operational data for a multiplicity of wireless access points (APs), wherein said operational data includes at least an indication of a number of client devices served by each of said APs; and
a receiver start of packet detection threshold (RX-SOP) manager to be executed by said processor and operative to:
select a wireless access point (AP) to process from among said multiplicity of APs based at least on said number of client devices served,
define a neighborhood based on said AP and neighboring APs, wherein said neighboring APs are within a one-hop radius of said AP,
calculate a client distribution optimal received signal strength indicator (RSSI), wherein said client distribution optimal RSSI (CD optimal) is a minimum receiver start of packet detection threshold (RX-SOP) setting for maintaining existing client device coverage by said AP;
calculate a neighbor relations optimal RSSI threshold (NR optimal), wherein said NR optimal is a function of at least a transmit power control threshold (TPC) for maintaining visibility between said AP and said neighboring APs;
calculate an RX-SOP setting for said AP as a function of said CD optimal and said NR optimal; and
apply said RX-SOP setting to said AP.

18. The system according to claim 17 wherein:
for at least two of said APs with a same said number of client devices served, said RX-SOP manager is configured to select said AP for processing according to a greater number of said neighboring APs.

19. The system according to claim 17 wherein said RX-SOP manager is operative to calculate said CD optimal as a function of a client acceptance threshold and a lowest observed client device RSSI, wherein:
a lowest RSSI check threshold (association cutoff) is defined based on a minimum observed RSSI at which a client device successfully associated with said AP;
an optimized roaming threshold (OR RSSI Cutoff) is defined based on a minimum observed RSSI for continuing an existing client device association with said AP; and
a client acceptance threshold is calculated as a minimum of said OR RSSI Cutoff and said association cutoff.

20. A system implemented on a computing device, the system comprising:
means for selecting a wireless access point (AP) to process from among a deployment of wireless access points (APs);
means for defining a neighborhood based on said AP and neighboring APs, wherein said neighboring APs are within a one-hop radius of said AP;
means for calculating a client distribution optimal received signal strength indicator (RSSI), wherein said client distribution optimal RSSI (CD optimal) is a minimum receiver start of packet detection threshold (RX-SOP) setting for maintaining existing client device coverage by said AP;
means for calculating a neighbor relations optimal RSSI threshold (NR optimal), wherein said NR optimal is a function of at least a transmit power control threshold (TPC) for maintaining visibility between said AP and said neighboring APs;
means for calculating an RX-SOP setting for said AP as a function of said CD optimal and said NR optimal; and
means for applying said RX-SOP setting to said AP.

* * * * *